March 20, 1962  A. HUET  3,026,258
ARTICULATED SYSTEM FOR CONTROL OF ASSEMBLY OF FUEL
RODS AND NEUTRON REFLECTOR PANELS
Filed March 31, 1958
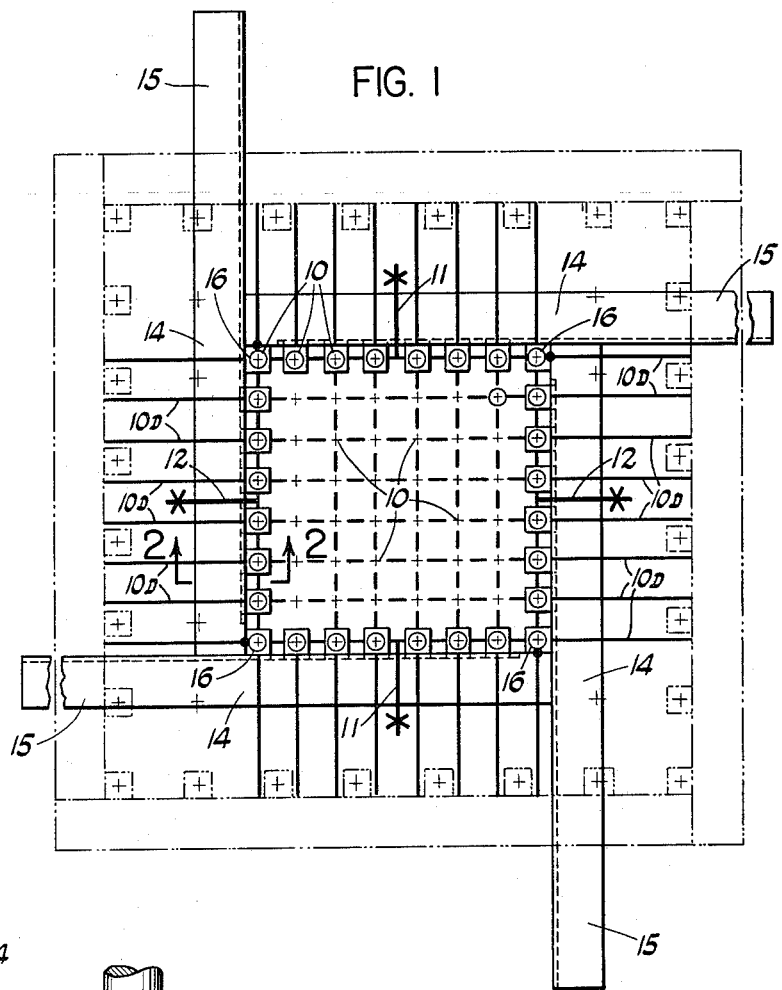
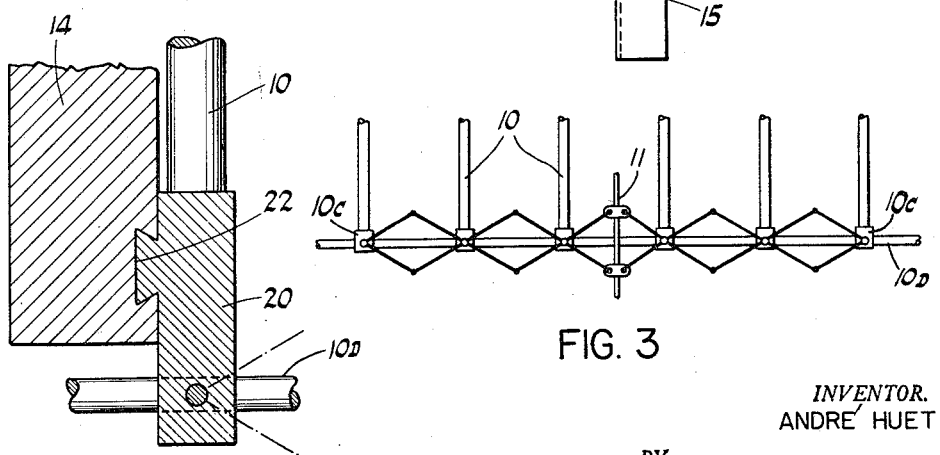
INVENTOR.
ANDRÉ HUET
BY James J. Whalen
ATTORNEY

United States Patent Office 3,026,258
Patented Mar. 20, 1962

3,026,258
ARTICULATED SYSTEM FOR CONTROL OF ASSEMBLY OF FUEL RODS AND NEUTRON REFLECTOR PANELS
André Huet, 48 Ave. du Président Wilson, Paris, France
Filed Mar. 31, 1958, Ser. No. 725,203
Claims priority, application France Apr. 4, 1957
2 Claims. (Cl. 204—193.2)

The present invention relates to nuclear reactors and particularly to an improved form of control mechanism for regulating the operating effectiveness of the reactor by relative movements of the fuel rods with simultaneous adjustments of reflector or moderating panels.

In his earlier application Serial No. 711,834, filed January 29, 1958, applicant has described an arrangement permitting the spreading apart or moving together of the fuel rods of a nuclear reactor mechanically and with accuracy.

The present invention has for its object an improvement of this arrangement which can be utilized for the simultaneous spacing of the moderating reflector or panels surrounding the group of fuel rods.

According to the present invention the reflector or moderating panels surrounding the array of rods in the reactor, and which are disposed for example, in the form of a parallelepipedic envelope, are such that each of them substantially bounds in one direction one of the faces of the parallelepiped. On each face one of the rods in a row of rods which extends along that face is connected with the reflector panel forming the said face to carry the panel with it, while the other bars of the row can slide freely in the direction of the length of the said panel. Consequently, the spreading or gathering movements of the assembly of rods provokes a sliding of these enclosing panels, enlarging or shrinking the volume of the parallelepiped, the panel faces of which continue in all positions to surround the assembly of rods.

In the drawing:

FIGURE 1 is a schematic plan view of a portion of a nuclear reactor embodying the present invention.

FIGURE 2 is a fragmentary view of the line 2—2 of FIGURE 1.

FIGURE 3 is a fragmentary diagrammatic view of mechanical linkage operable for varying the spacing of fuel rods in a row or varying the spacing of rows of rods.

As has been described in the aforesaid application Serial No. 711,834, rows of fuel rods 10 are carried in individual mounts 10C in such manner as to be able to slide along support and guide bars 10D. These fuel rods, or rather their mounts 10C, in each row are joined among themselves by a linkage system such as articulated rhombuses or levers that form a lazy tongs linkage, which is fragmentarily shown in FIGURE 2. Each row of rods 10 has a fixed reference point 11 or 12 represented by a heavy line in FIGURE 1 for the two outermost horizontal and vertical rows respectively of the assemblage of fuel rods. The fuel rods at either side of this reference point move in the same direction and oppositely to those at the other side, as the rods are moved closer together or spread apart by the linkage. The various rows of fuel rods are likewise connected together by similar lazy tong linkages in order to enable the various rows of rods to be moved closer together and further apart located as units. The fixed points 11 and 12 in the rows of rods are on the axes of symmetry of the array of fuel rods, which in FIGURE 1 are disposed in the geometrical form of a square.

The geometrical array of fuel rods as is practiced in a nuclear reactor are surrounded by neutron reflecting or moderating panels 14. In the full line position of FIGURE 1 the rods 10 are represented in their aspect of maximum approach to each other. The array of fuel rods then takes on a form of a parallelepiped of square section whose boundary faces are constituted by the reflector panels 14 which can be of graphite, concrete or again may be in the form of tanks or boxes containing heavy water, or any other moderating reflecting or protective material or device. Each of the faces of the parallelepiped of square section the moderating panels 14 have extensions 15 projecting beyond the boundaries of the normal minimum square. With this construction one of the rods of the row extending along a panel 14 (for example, the fuel rod 16 which happens to be at the end of the row) is fixed to the panel 14 while being maintained spaced from it by a predetermined distance. The connection between the bar 16 and panel 14 is such that it may maintain this distance constant at the desired value following the applications in mind.

Consequently, when a separation of the fuel rods 10 from the full line positions of FIG. 1 is effected by means of an articulated lazy tongs system or the like, as described in the prior application each panel 14 follows the displacements of the particular fuel rod 16 to which it is connected and moves away from the axes of symmetry 11—11 or 12—12 on which lie the fixed points 11, 12 from which the elements of the lazy tongs system spread out to effect the spacing of the fuel rods in each row, or the spacings between the rows of rods. It follows from this that the panels 14 slide relatively to each other in moving apart while continuing to enclose or surround the array of fuel rods 10. According to whether one acts on one or the other of the articulated systems controlling the displacement of the fuel rods in a row or the rows of rods with respect to each other (or on both systems), one can thus bring about within the limits of coverage of the panels 14 any desired changes in the volume given to the parallelepiped containing the fuel rods by producing various square or rectangular sections comprised between the minimum square or position in which the fuel rods 10 are closest together (as is represented in full lines in FIGURE 1) and the maximum square represented by the contour in dot-dash lines in which position the entire disposable length of the panels 14 (including the part of each designated as a projection 15) are utilized to create the box or parallelepiped or walls enclose the fuel rod assembly.

The array of rods and panels 14 may be disposed in a tank or other protecting envelope containing the heat transmitting fluid that traverses the reactor so that despite the increases or diminutions of the volume of the parallelepiped containing the rods the fluid always fills it; the emptying or the refilling of the parallelepiped being effected to the detriment or gain of the volume of fluid contained outside the parallelepiped in the surrounding tank.

The fuel rods 10 (other than those designated 16 of the outermost rows situated along the reflector panels 14) are mounted so that they may slide freely in the direction of the length of the panels 14. For this purpose, on a socket 20 fixed to or solid with each rod 10, one may provide a shank or key 22 which slides in a groove of corresponding form provided in the panel 14 as is shown in FIGURE 2.

The arrangement which has just been described permits realizing at will by means of a simply mechanical system all positions of spacing of fuel rods within the reactor while maintaining homogeneity in their arrangements within the latter and consequently permits regulation of the quantity of heat which can be furnished by the reactor in accordance with need.

The possibilities offered by this arrangement to displace rapidly the different rods of a reactor with precision while preserving a precise spacing among themselves permits a method of reactor operation enabling the application to a system of all predetermined formulas for thermal reactions.

According to this aspect of the present invention the mechanical systems which control the rods of the reactor may be driven by motor devices (electrically for example) which can permit determined schemes of displacement at speeds or at accelerations of any form whatsoever. Consequently, the relative movements of the fuel rods can obey all predetermined formulas for creating variations of reciprocal influence, as desired, corresponding to all desired renderings of the reactor array. One can for example bring about in this manner reactions of heat at elevated temperatures obeying an oscillating formula or one that is periodical, permitting increases of temperature change very rapidly followed by lowerings to the smallest exchange of heat so that the apparatus in operation accommodates more elevated temperatures without presenting danger.

What I claim is:

1. In a nuclear reactor having fuel elements in the form of rods arranged in spaced relation in parallel rows to form a rectangular array; mechanical linkages interconnecting the rods in each row and operable for conjointly regulating the relative positions of the rods in the row; individual supports for each row of rods on which the rods of a single row are mounted in such manner as to enable them to slide thereon upon operation of said linkage to modify the spacings of said rods, and another mechanical linkage interconnecting said supports and acting perpendicular to the first linkage to permit modification of the spacings between the rows of reactor rods; neutron reflector panels at the sides of said rectangular array of rods arranged to form a parallelepiped enclosing said array of rods; and a connection between at least one rod in each outermost row forming the rectangular grouping and the adjacent neutron reflector panel for simultaneously moving said neutron reflector panel along with said rod and the row in which it is located to change the size of said parallelepiped as the spacing of the rods within the parallelepiped is varied by operation of said linkages.

2. A reactor as recited in claim 1 wherein the neutron reflector panels that form the sides of the parallelepiped enclosing the rectangular array of rods are of a length in a direction paralleling the rows of rods that is greater than the length of a row of rods when the latter are in their most closely spaced relation so as to extend beyond the rectangle formed by the array of rods when the latter are in their positions of closest proximity; said neutron reflector panels being long enough to fully enclose said array of rods when the rods are in their most widely spaced relation.

References Cited in the file of this patent

UNITED STATES PATENTS

| | | |
|---|---|---|
| 425,168 | Gale | Apr. 8, 1890 |
| 515,051 | Krah | Feb. 20, 1894 |
| 1,346,646 | Gallagher | July 13, 1920 |
| 2,714,577 | Fermi et al. | Aug. 2, 1955 |
| 2,852,456 | Wade | Sept. 16, 1958 |

FOREIGN PATENTS

| | | |
|---|---|---|
| 132,646 | Australia | May 17, 1949 |